United States Patent [19]

Vokins et al.

[11] Patent Number: 5,431,549
[45] Date of Patent: Jul. 11, 1995

[54] BIDIRECTIONAL ASPETIC VOLUME FILLER

[75] Inventors: Ian M. Vokins; James B. Abbott, both of Fresno, Calif.

[73] Assignee: FMC Corporation, Chicago, Ill.

[21] Appl. No.: 17,204

[22] Filed: Feb. 12, 1993

[51] Int. Cl.⁶ .............................................. F04B 7/00
[52] U.S. Cl. .................................... 417/517; 417/519
[58] Field of Search ............... 417/510, 515, 517, 519, 417/532

[56] References Cited

U.S. PATENT DOCUMENTS

| | | | |
|---|---|---|---|
| 726,429 | 4/1903 | Hicks | 417/517 |
| 1,041,939 | 10/1912 | Aborn | 417/517 |
| 1,225,274 | 5/1917 | Roberts | 417/515 |
| 1,470,426 | 10/1923 | Danstrup | 417/517 |
| 1,508,806 | 9/1924 | Silvestri | 417/519 |
| 1,519,670 | 12/1924 | Danstrup | 417/517 |
| 2,104,373 | 1/1938 | McNeil | 417/517 |
| 2,451,575 | 10/1948 | Paxton | 60/472 |
| 2,908,424 | 10/1959 | Illsley | 222/250 |
| 3,208,664 | 9/1965 | Rice et al. | 417/517 |
| 3,875,967 | 8/1975 | DeFries | 137/625.66 |

FOREIGN PATENT DOCUMENTS

| | | |
|---|---|---|
| 0074439 | 3/1983 | European Pat. Off. . |
| 2591284 | 6/1987 | France . |
| 0823555 | 10/1951 | Germany . |
| 8808143 | 12/1988 | Germany . |
| 0020359 | of 1913 | United Kingdom . |
| 0672196 | 5/1952 | United Kingdom . |

Primary Examiner—Richard A. Bertsch
Assistant Examiner—Peter Korytnyk
Attorney, Agent, or Firm—Michael Lee; R. C. Kamp

[57] ABSTRACT

The invention provides a series of bi-directional aseptic volume filler cylinders, that are able to provide measured volume fillers as the piston is driven in both directions by providing an aseptic disk value which is able to direct material in the desired directions. Both sides of the chamber are able to draw material from a single passage and output material to a single passage.

5 Claims, 4 Drawing Sheets

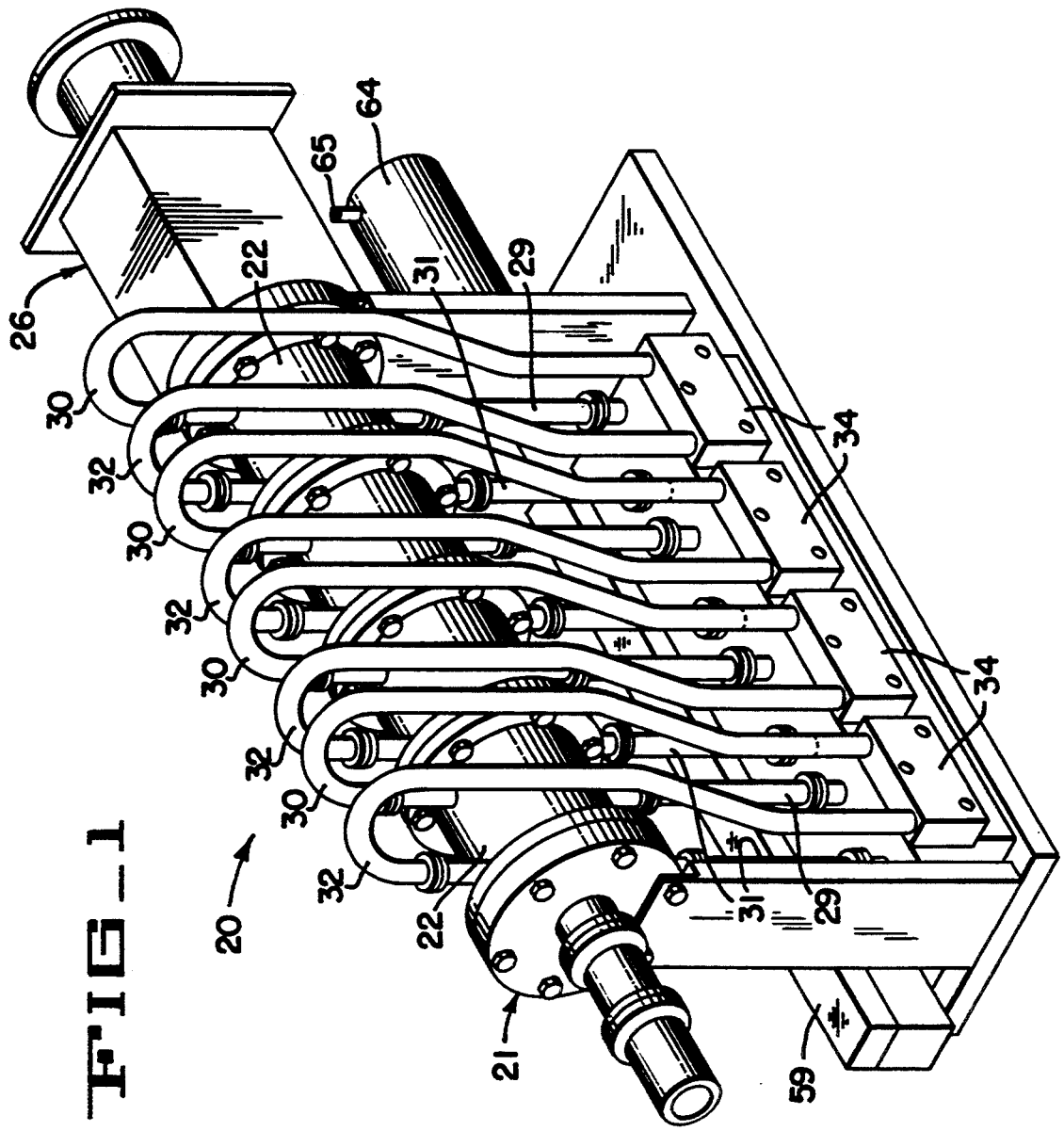

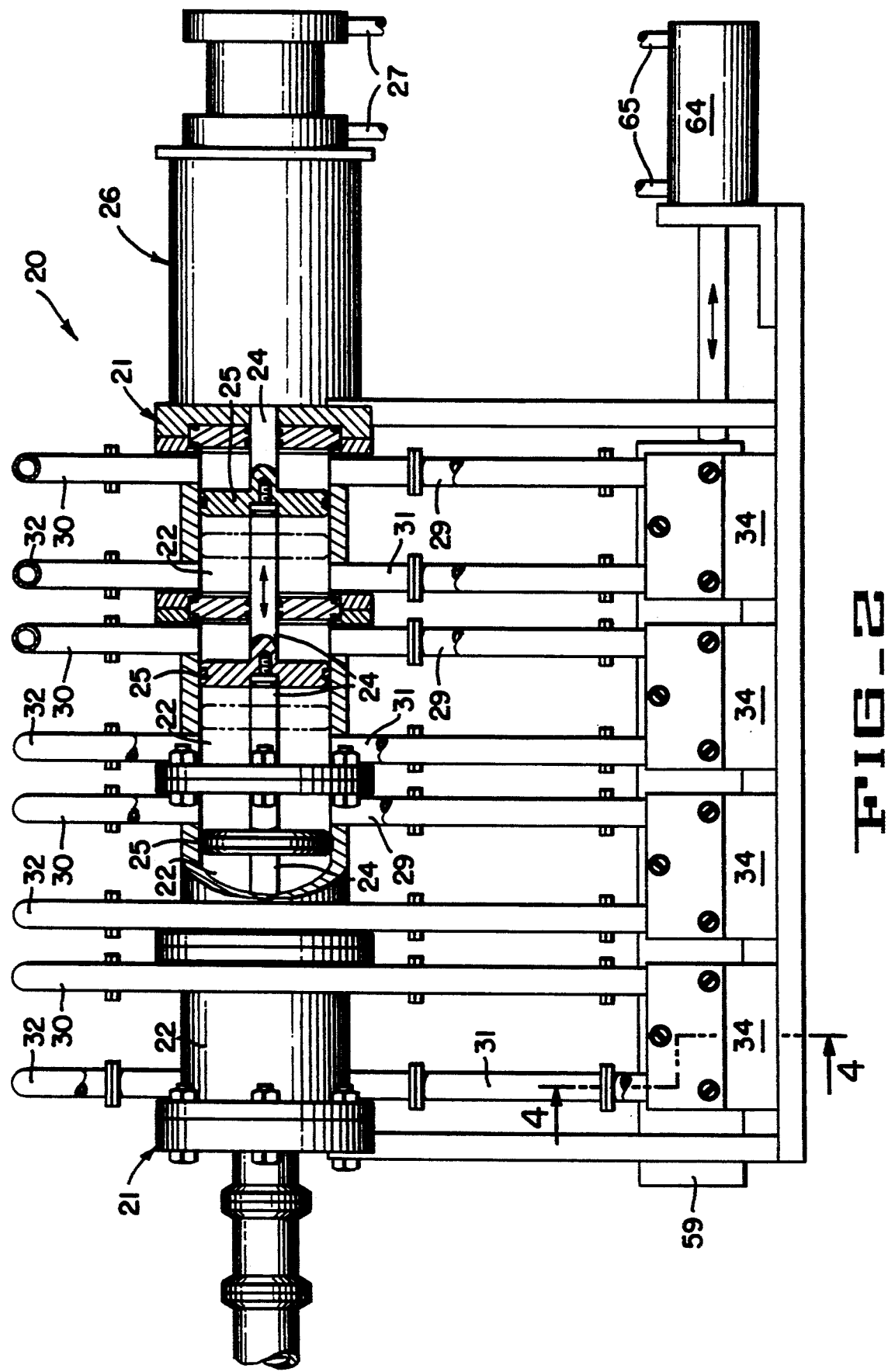
FIG_2

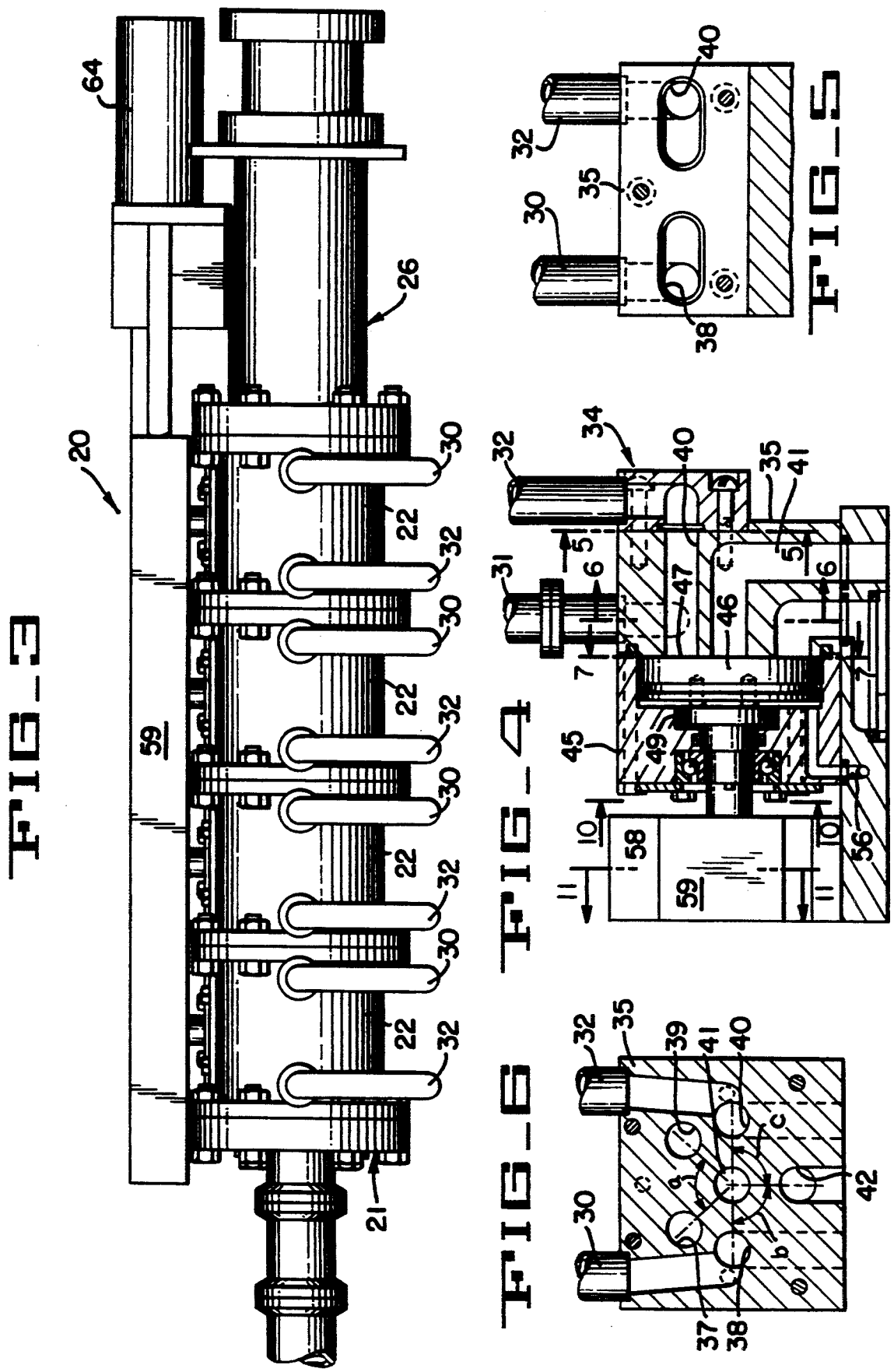

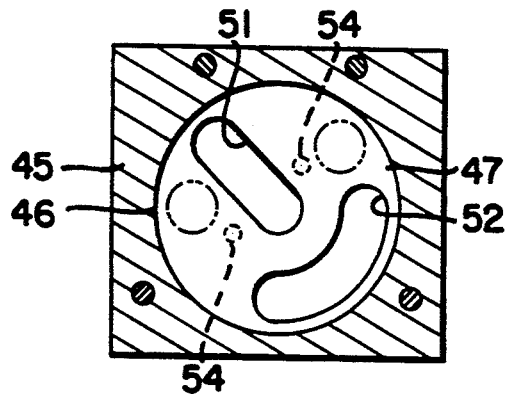
FIG_7
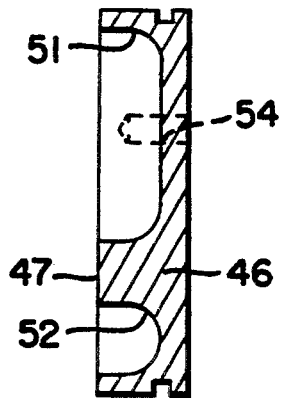
FIG_9
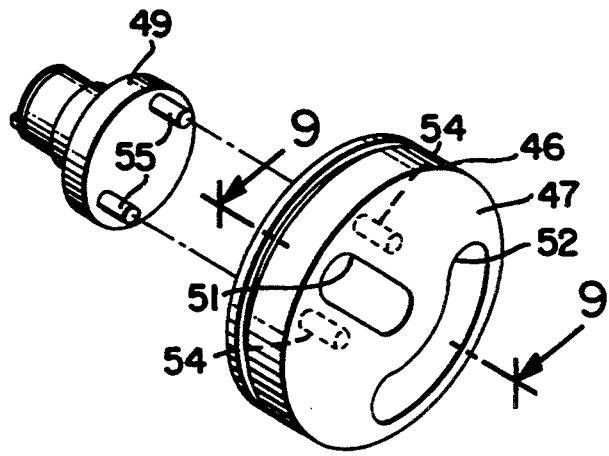
FIG_8
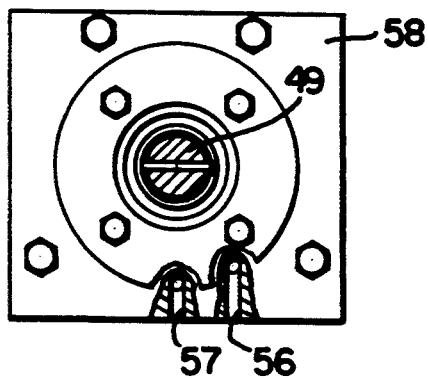
FIG_10
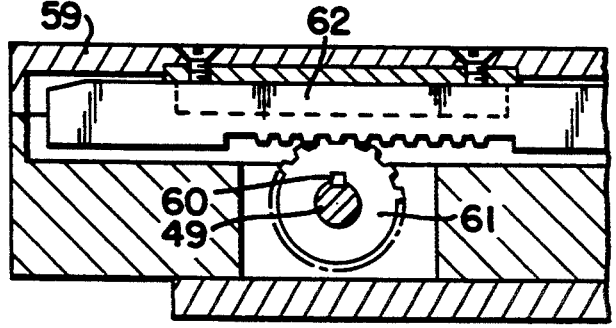
FIG_11

BIDIRECTIONAL ASPETIC VOLUME FILLER

BACKGROUND AND SUMMARY OF THE INVENTION

Many volume fillers use a piston to provide a predetermined volume of material. The invention provides an aseptic volume filler that provides a predetermined volume of material as the piston moves in either direction during the stroke.

BRIEF DESCRIPTION OF THE DRAWINGS

FIG. 1 is a perspective view of a filler comprising a preferred embodiment of the invention.

FIG. 2 is a side elevation with parts cut away of the filler in FIG. 1.

FIG. 3 is a top view of the filler in FIG. 1.

FIG. 4 is a section taken along lines 4—4 of FIG. 2.

FIG. 5 is a section taken along lines 5—5 of FIG. 4.

FIG. 6 is a section taken along lines 6—6 of FIG. 4.

FIG. 7 is a section taken along lines 7—7 of FIG. 4.

FIG. 8 is a perspective view of the valve switching means and driver forming part of the valve shown in FIG. 4.

FIG. 9 is a section taken along lines 9—9 of FIG. 8.

FIG. 10 is a section taken along lines 10—10 of FIG. 4.

FIG. 11 is a section taken along lines 11—11 of FIG. 4.

DESCRIPTION OF THE PREFERRED EMBODIMENTS

FIG. 1 shows a perspective view of a filler 20 using a preferred embodiment of the invention. FIG. 2 is a side elevation of the filler 20 with pans cut away. FIG. 3 is a top view of the filler 20. In the preferred embodiment, the filler 20 comprises a single vessel 21 with four cylindrical chambers 22. The center axis of the cylindrical chambers 22 are coaxial. A piston rod 24 runs along the center axis of the cylindrical chambers 22. In each chamber 22 is a piston 25 mechanically connected to the piston rod 24. Welding may be used to mechanically connect the piston 25 to the piston rod 24. Mechanically connected to a first end of the piston rod 24 is a piston rod driving means 26, which causes the piston rod 24 to reciprocate along the center axis of the cylindrical chambers 22 as shown by the double headed arrow in FIG. 2. In this embodiment piston rod air lines 27 are used to drive the piston rod driving means 26.

Each chamber 22 has a first side, which is closer to the piston rod driving means 26 and a second side which is further from the piston rod driving means 26. Each first side of each chamber has a first side intake tube 29 and a first side output tube 30. Each second side of each chamber has a second side intake tube 31 and a second side output tube 32. Each intake tube 29, 31 and each output tube 30, 32 has a first end connected to a chamber 22 and a second end connected to a valve 34, which will be described in more detail below. As shown in FIG. 2, the filler 20 comprises four valves 34, with one valve 34 for each cylindrical chamber 22. For a set of a first side intake tube 29, a first side output tube 30, a second side intake tube 31, and a second side output tube 32, where the first sides of the set of a first side intake tube 29, a first side output tube 30, a second side intake tube 31, and a second side output tube 32 are all connected to the same cylindrical chamber 22, the second sides of the set of the first side intake tube 29, the first side output tube 30, the second side intake tube 31, and the second side output tube 32 are all connected to the same valve 34.

FIG. 4 is a section of a valve 34, as shown in FIG. 2 by lines 4—4. FIG. 5 is a section of the valve 34 in FIG. 4 taken along lines 5—5. FIG. 6 is a section of the valve 34 in FIG. 4 taken along lines 6—6. FIG. 7 is a section of the valve 34 in FIG. 4 taken along lines 7—7. As mentioned before, connected to the valve 34 are second ends of a first side intake tube 29, a first side output tube 30, a second side intake tube 31, and a second side output tube 32. The valve 34 comprises a passage housing 35 with a plurality of passages, a disk housing 45, and a disk 46. The second end of the first side intake tube 29 is in fluid connection with a first side of a first passage 37. In the specification, when it is stated that one object is in fluid connection with another, it is defined as meaning that fluid is able to pass from the one object to the other. The second end of the first side output tube 30 is in fluid connection with a first side of a second passage 38. The second end of the second side intake tube 31 is in fluid connection with a first side of a third passage 39. The second end of the second side output tube 32 is in fluid connection with a first side of a fourth passage 40. A fifth passage 41 is in fluid connection with an intake source, not shown. A sixth passage 42 is in fluid connection with an output volume, not shown.

The disk 46 is placed in the disk housing 45 adjacent to the passage housing 35, and is illustrated in FIGS. 7-9. A circular face 47, with a center, of the disk 46 is adjacent to the passage housing 35. In the preferred embodiment, a first end 41 of the fifth passage is adjacent to the center of the circular face 47 The second end of the first passage 37 and the second end of the third passage 39 are spaced equal distances from the center of the circular face 47 and adjacent to the circular face 47. In addition, the center of the second end of the first passage 37 and the second end of the third passage 39 form an angle $a = 90°$ with the center of the circular face 47. The second end of the second passage 38 the second end of the fourth passage 40, and the second end of the sixth passage 42 are all equal distances from the center of the circular face 47 and adjacent to the circular face 47. The second end of the second passage 38 and the second end of the sixth passage 42 form an angle $= 90°$ with the center of the circular face 47. The second end of the fourth passage 40 and the second end of the sixth passage 42 form an angle $c = 90°$ with the center of the circular face 47.

FIG. 8 is a perspective view of the disk 46 and a disk driver 49. FIG. 9 is a cross sectional view of the disk 6 shown in FIG. 8 along lines 9—9. The circular face 47 of the disk 46 has a first groove 51 and a second groove 52. In the preferred embodiment, the first groove 51 is linear and extends from the center of the circular face 47 to a distance approximately equal to the distance that the second ends of the first passage 37 and the third passage 39 are from the center of the circular face 47, so that the first groove 51 forms a passage from the fifth passage 41 to either the first passage 37 or the third passage 39. The second groove 52 forms an arc, wherein the arc is spaced a distance from the center of the circular face 47 equal to the distance that the second ends of the second passage 38, fourth passage 40 and sixth passage 42 are from the center of the circular face 47, so that the second groove 52 forms a passage between the second end of the sixth passage 42 and the second end of the second passage 38 or the second end of the fourth passage 40. On the side of the disk 46 opposite from the circular face 47 are a pair of holes 54, which match with a pair of pegs 55 on the disk driver 49 to provide positive engagement between the disk driver 49 and the disk 46.

FIG. 10 is a section of the valve 34 shown in FIG. 4 along lines 10—10. A face plate 54 forms a side of the disk housing 45. The disk driver 49 extends through the face plate 54 as a shaft. A first air passage 56 and a second air passage 57 extend through the disk housing 45. The first air passage 56 and the second air passage 57 provide air to and vent air from the disk housing 45 to force the disk 46 against the passage housing 35 with a desired force.

FIG. 11 is a section of the valve shown in FIG. 4 along lines 11—11. Within a driver housing 59, the disk driver 49, which extends into the driver housing 59, is keyed by a key 60 to a pinion 61. The pinion 61 is engaged with a rack 62. The rack 62 is also engaged to pinions 61 of the other valves 34. Mechanically connected to a first end of the rack 62 is a rack driving means 64, which causes the rack 62 to reciprocate as shown by the double headed arrow in FIG. 2. In this embodiment rack air lines 65 are used to drive the rack driving means 64.

In operation in this example first, air through rack air lines 65 cause the rack driving means 64 to reciprocate the rack 62 to the right as viewed in FIG. 2. The rack 62 rotates the pinions 61 in a clockwise direction as viewed in FIG. 11. The rotation of the pinions 61 in a clockwise direction as viewed in FIG. 11 would rotate the disk driver and disk in clockwise direction as viewed in FIG. 8, which would be a counter clockwise direction as viewed in FIGS. 6 and 7, since FIGS. 6 and 7 are viewed from the opposite direction than FIGS. 8 and 11. When the rack 62 is completely reciprocated to the fight, the first groove 51 extends from the second end of the first passage 37 to the second end of the fifth passage 41, forming a passage from the second end of the first passage 37 to the second end of the fifth passage 41. The second groove 52 extends from the second end of the fourth passage 40 to the second end of the sixth passage 42, so that the second groove 52 forms a passage from the second end of the fourth passage 40 to the second end of the sixth passage 42. Air pressure is provided by the first and second air passages 56, 57 to press the disk 46 against the passage housing 35. The piston rod air lines 27 cause the piston rod driving means 26 to drive the piston rod 24 to the left as viewed in FIGS. 1 to 3. The piston rod 24 drives the pistons 25 to the left as viewed in FIG. 2, which causes the volumes on the first side of the pistons 25 to increase and the volumes on the second side of the pistons 25 to decrease. Since the volumes on the first side of the pistons 25 are increasing, material must be provided to the volumes on the first side of the pistons. The material may pass through either first side intake tubes 29 or first side output tubes 30. Since the first side output tubes 30 are connected to the first ends of the second passages 38 and the second sides of the second passages 38 are not adjacent to the second grooves 52 and therefore are adjacent to the circular faces 47 of the disks, material cannot be provided to the volume from the first side output tubes 30. On the other hand, the first side intake tubes 29 are connected to the first ends of the first passages 37, which are adjacent to the first grooves 51 which form passages to the fifth passages 41, thus material under pressure is provided to the fifth passages 41 and passes from the fifth passages through the first grooves 51 through the first passages 37 through the first side intake tubes 29 into the volumes on the first sides of the pistons 25 Since the volumes on the second side of the pistons 25 are decreasing, material is pushed out of the volumes on the second side of the pistons 25. The material may pass through either second side intake tubes 31 or second side output tubes 32. Since the second side intake tubes 31 are connected to the first ends of the third passages 39 and the second sides of the third passages 39 are not adjacent to the first grooves 51 and therefore are adjacent to the circular faces 47 of the disks, material cannot be pushed out of the volume from the second side intake tubes 31. On the other hand, the second side output tubes 32 are connected to the first ends of the fourth passages 40, which are adjacent to the second grooves 52 which form passages to the sixth passages 42, thus allowing material to pass from the volumes on the second side of the pistons 25 through the second side output tubes 32 through the fourth passages 40 through the second grooves 52 and through the sixth passages 42 out of the system.

Next air through rack air lines 65 cause the rack driving means 64 to reciprocate the rack 62 completely to the left as viewed in FIG. 2. The rack 62 rotates the pinions 61 in a counter clockwise direction as viewed in FIG. 11. The rotation of the pinions 61 in a counter clockwise direction as viewed in FIG. 11 would rotate the disk driver and disk in counter clockwise direction as viewed in FIG. 8, which would be a clockwise direction as viewed in FIGS. 6 and 7, since FIGS. 6 and 7 are viewed from the opposite direction than FIGS. 8 and 11. When the rack 62 is completely reciprocated to the left, the first groove 51 extends from the second end of the third passage 39 to the second end of the fifth passage 41, forming a passage from the second end of the third passage 39 to the second end of the fifth passage 41. The second groove 52 extends from the second end of the second passage 38 to the second end of the sixth passage 42, so that the second groove 52 forms a passage from the second end of the second passage 38 to the second end of the sixth passage 42. The piston rod air lines 27 cause the piston rod driving means 26 to drive the piston rod 24 to the right as viewed in FIGS. 1 to 3. The piston rod 24 drives the pistons 25 to the right as viewed in FIG. 2, which causes the volumes on the first side of the pistons 25 to decrease and the volumes on the second side of the pistons 25 to increase. Since the volumes on the second side of the pistons 25 are increasing, material is provided to the volumes on the first side of the pistons. The material may pass through either second side intake tubes 31 or second side output tubes 32. Since the second side output tubes 32 are connected to the first ends of the fourth passages 40 and the second sides of the fourth passages 40 are not adjacent to the second grooves 52 and therefore are adjacent to the circular faces 47 of the disks, material cannot be provided to the volumes from the second side output tubes 32. On the other hand, the second side intake tubes 31 are connected to the first ends of the third passages 39, which are adjacent to the first grooves 51 which form passages to the fifth passages 41, thus material under pressure is provided to the fifth passages 41, and from the fifth passages 41 passes through the first grooves 51 through the third passages 39 through the second side intake tubes 31 into the volumes on the second sides of the pistons 25 Since the volumes on the first side of the pistons 25 are decreasing, material is pushed out of the volumes on the first side of the pistons 25. The material may pass through either first side intake tubes 29 or first side output tubes 30. Since the first side intake tubes 29 are connected to the first ends of the first passages 37 and the second sides of the first passages 37 are not adjacent to the first grooves 51 and therefore are adjacent to the circular faces 47 of the disks 46, material cannot pushed out of the volume from the first side intake tubes 31. On the other hand, the first side output tubes 30 are connected to the first ends of the second passages 38, which are adjacent to the second grooves 52 which form passages to the sixth passages 42, thus allowing material to pass from the volumes on the first side of the pistons 25 through the first side output tubes 30 through the second passages 38 through the second grooves 52 and through the sixth passages 42 out of the system.

Prior to the above filling operation, the filler is sterilized. This is achieved when following a cleaning regime where the piston rod 24 draws the pistons 25 completely to the right as viewed in FIG. 2. The pistons 25 are adjacent to the first side intake tubes 29 and the first side, out put tubes 30 where the cylindrical chambers 22 slightly widen. The parts of the piston rod 24 adjacent to dividers 15 between the cylindrical chambers are tapered slightly so that there is a gap between the piston rod 24 and seals 16 between the cylindrical chambers 22. In addition, air is vented through the second air passage 57, so that the disk 46 may be pushed away from the air housing. Steam is ported to the first air passage 56 to sterilize one side of the disk 46 and part of the disk housing. Steam is also provided to the second end of the fifth passage 41 and flows to the disk 46, pushing the disk 46 away from the passage housing 35 sterilizing the entire circular face 47 and part of the passage housing 35. The steam then flows through the first passages 37 and the third passages 39 and through the first side intake tube 29 and the second side intake tube 31 to the cylindrical chambers 22. Because of the tapers, the steam is able to flow all around the pistons 25 and the piston rod 24. The steam then flows through the first side out put tube 30 and the second side out put tube 32, through the second passage 38 and the fourth passage 40 to the disk 46 and through the sixth passage 42 out of the system. This process allows sterilization following a CIP (cleaning in place) operation, providing a bi-directional aseptic volume filler which is sterilizable and CIPable. Both sides of the chamber are able to receive material from a single passage and out put material to a single passage.

As there is a common piston shaft. This system only requires steam tracing at both ends.

In the specification and claims, the term "disk" includes any object with at least partially circular cross section. A cross section of a right cylinder, or a cone or a sphere could be a disk as defined in the specification and claims. In the preferred embodiment the disk is made of carbon such as graphite.

While a preferred embodiment of the present invention has been shown and described herein, it will be appreciated that various changes and modifications may be made therein without departing from the spirit of the invention as defined by the scope of the appended claims.

What is claimed is:

1. An apparatus for providing a measured volume of material, comprising:
    a chamber;
    a piston within the chamber, forming a first side of the chamber on a first side of the piston and a second side of the chamber on a second side of the piston;
    a piston rod connected to the piston;
    means for reciprocating the piston rod and piston within the chamber;
    a first side output tube with a first end and a second end, with the first end of the first side output tube in fluid connection with the first side of the chamber;
    a first side intake tube with a first end and a second end, with the first end of the first side intake tube in fluid connection with the first side of the chamber;
    a second side output tube with a first end and a second end, with the first end of the second side output tube in fluid connection with the second side of the chamber;
    a second side intake tube with a first end and a second end, with the first end of the second side intake tube in fluid connection with the second side of the chamber;
    a passage housing with a first passage, a second passage, a third passage, a fourth passage, a fifth passage, and a six passage passing through the passage housing, wherein the second end of the first side output tube is in fluid connection with a first end the first passage, the second end of the first side intake tube is in fluid connection with a first end of the second passage, the second end of the second side output tube is in fluid connection with a first end the third passage, the second end of the second side intake tube is in fluid connection with a first end of the fourth passage;
    a disk with a first groove and a second groove adjacent to a face of the passage housing, wherein the second ends of the first passage, the second passage, the third passage, and the fourth passage, and the first ends of the fifth passage and the sixth passage are adjacent to the disk and wherein the second end of the fifth passage is in fluid connection with outside of the apparatus and wherein the second end of the sixth passage is in fluid connection with outside of the apparatus; and
    means for rotating the disk.

2. An apparatus, as claimed in claim 1, further comprising:
    a disk housing adjacent to the disk; and
    means for providing pressure between the disk housing and the disk to force the disk against the passage housing.

3. An apparatus, as claimed in claim 2, wherein the disk has a face with a circular circumference and a center of the circular circumference and wherein the face is adjacent to the passage housing and wherein the first and second grooves are on the face.

4. An apparatus, as claimed in claim 3, wherein the second ends of the first passage, the second passage, the third passage and the fourth passage and the first ends of the fifth passage and the sixth passage terminate on a face of the passage housing and adjacent to the face of the disk.

5. An apparatus, as claimed in claim 4, wherein the second ends of the first passage and second passage are equal distances from the center of the face of the disk and wherein the second ends of the third passage and the fourth passage are equal distances from the center of the face of the disk.

* * * * *